Jan. 5, 1954  P. H. HALBRITER  2,664,810
CAKE PRESERVER DEVICE
Filed Dec. 19, 1949

INVENTOR
PERCY H. HALBRITER
BY
Mason & Graham
ATTORNEYS

Patented Jan. 5, 1954

2,664,810

UNITED STATES PATENT OFFICE 2,664,810

CAKE PRESERVER DEVICE

Percy H. Halbriter, Los Angeles, Calif.

Application December 19, 1949, Serial No. 133,742

2 Claims. (Cl. 99—234)

This invention has to do with means for the preservation of edible cakes and the like by retaining the cake moist after the same has been cut.

As is well known, once a cake has been cut, leaving one or more exposed surfaces, the cake quickly dries out, thereby materially impairing its quality.

It is an object of this invention to provide a novel article for use in preserving cakes and the like by retaining the moisture in the cake after the cake has been cut, the article being adapted to cover the cut surfaces of the cake.

Another object is to provide an article or device of the type indicated which may be readily adjusted to fit against the two exposed surfaces of the common circular cake regardless of the angle of disposition of these cut surfaces.

A further object is to provide a device of the type indicated which folds to a relatively compact unit.

Still another object of the invention is to provide a device which will support a slice of bread or other substance in such a way that the device may be placed adjacent the cut surfaces of the cake with the bread against the cake. In this connection it is an object to provide such a device which is so constructed that it will remain in proper or desired position relative to the cake.

Another object is to provide a cake-preserving device having means for supporting moisture pellets or the like.

Still another object is to provide a device of the type indicated which is attractive in appearance and may be readily fabricated.

These and other objects will be apparent from the drawing and the following description.

Referring to the drawings.

Figure 1:
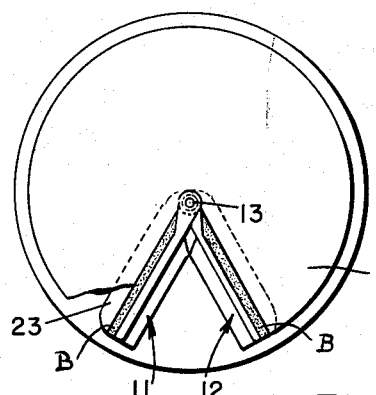
Fig. 1 is a plan view of the device embodying the invention shown associated with a cake.
Figure 4:
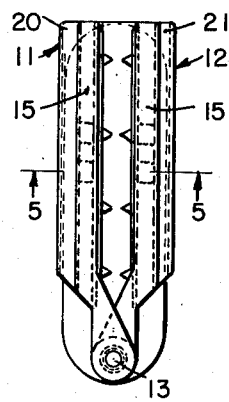
Fig. 4 is a plan view of the device in closed position.
Figure 5:
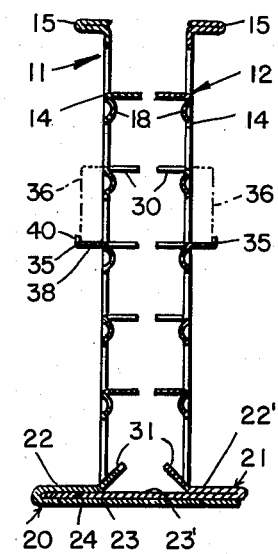
Fig. 5 is a section on line 5—5 of Fig. 4.
Figure 2:
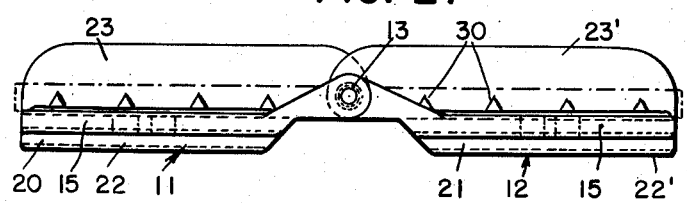
Fig. 2 is an enlarged plan view of the device of Fig. 1, the two sections thereof being disposed in alignment.
Figure 3:
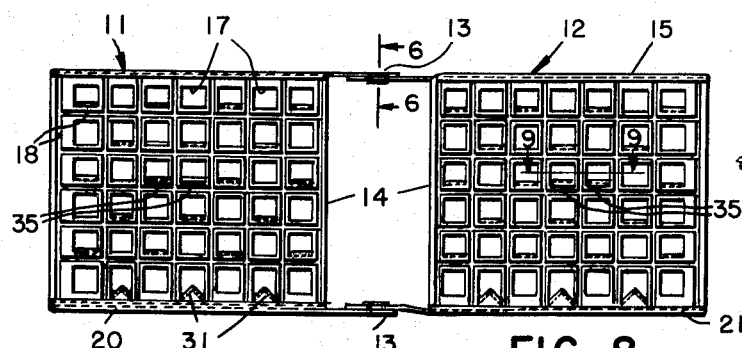
Fig. 3 is an elevational or face view of the device.
Figure 6:
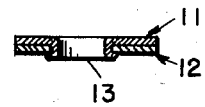
Fig. 6 is a section on line 6—6 of Fig. 3.
Figure 9:
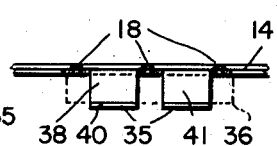
Fig. 9 is a section on line 9—9 of Fig. 3.
Figure 7:
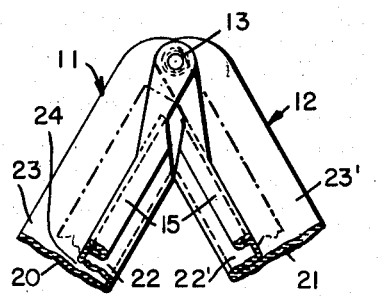
Fig. 7 is an enlarged fragmentary plan view of the hinged portion of the device with the parts in the position they are shown in Fig. 1.
Figure 8:
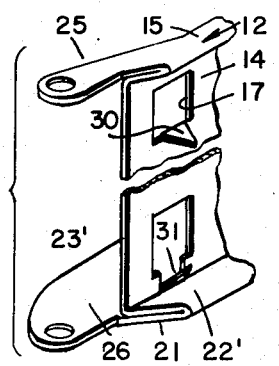
Fig. 8 is an enlarged fragmentary perspective view of one of the plates.

More particularly describing the invention, the device comprises a pair of complementary sections 11 and 12 which are hingedly secured together at 13 so that the two sections may be disposed at any angle from that shown in Fig. 1 to that shown in Fig. 4. Each section includes a perforate plate or body 14 provided with an upper marginal flange 15 which projects outwardly of the plane of the plate. The flanges 15 are made by doubling the material of the plate back upon itself as shown in Fig. 5. In this connection I prefer to make the device of a suitable sheet metal which is either of a non-corrosive nature, such as stainless steel or which may have a suitable coating of relatively non-corrosive material. Of course, I contemplate that the device may economically be formed by stamping operations from sheet metal. However, I wish it understood that the device might be molded or cast and that various materials, such as common plastics, might be used.

Each plate 14 is provided with a plurality of openings or holes 17 which may be of any desired configuration. In the form of the invention shown the plates are provided with ribs 18 to strengthen and stiffen them.

At their lower margins the plates are provided with base flanges, generally indicated by 20 and 21. The flange 20 on the section 11 is formed to provide an outwardly projecting section 22 and an inwardly projecting section 23 of considerably greater length than the section 22. These sections are spaced apart sufficiently to provide a recess 24 therebetween.

The flange 21 comprises the sections 22' and 23' which are similar to the sections 22 and 23 previously described except that they are disposed in contact with each other whereby when the device is closed, as shown in Figs. 4 and 5, the end portion of the section 23' is received in the recess 24 of the base 20.

The upper flanges 15 and the lower flanges or bases 20—21 are provided with extensions 25 and 26 respectively which are hingedly connected by the hinges 13.

In the use of the device it is desirable to employ a slice of bread B between each of the sections 11 and 12 and the cut surface of the cake C. For the purpose of supporting the bread on the device, each of the plates 14 is provided with a plurality of laterally projecting barbs 30 and with a lower row of lower barbs 31 projecting angularly upwardly. It will be apparent that a piece of bread may readily be impaled upon these barbs and retained on the device.

In use, the device is adjusted to the proper angle and then with a slice of bread impaled or mounted on each of the plates, the device is placed against the cut surfaces of the cake with the slices of bread against the cake. The base flange sections 23 and 23' are long enough that they must necessarily be slid under the bottom of the cake and this construction serves to anchor the device in proper relation to the cake.

If desired, the plates 14 may be provided with a shelf or receptacle 35 for receiving any moisture pellet 36 or the like. This receptacle may be formed by a pair of outwardly extending sections 38 and 39, the edges of which have been turned up at 40 and 41.

Although the invention has been particularly shown and described, it is contemplated that various changes and modifications may be made without departing from the scope thereof as indicated by the following claims.

It will also be apparent that although the device has been illustrated and described for use in preserving round cakes from which pie-shaped segments or pieces are ordinarily cut, it will be apparent that the device may readily be used to cover merely one end of an elongated loaf-like cake.

By having the plates perforate as shown, the openings in the plates provide for a circulation of air to the slices of bread impaled on the plates. This serves to prevent mustiness, mold, and mildew of the bread to a large degree and, also, I have found, serves to prevent the bread from buckling as the same partially dries.

I claim:

1. A device for retaining edible cakes after the same have been cut, comprising a pair of corresponding rectangular perforate plates hingedly secured together, said plates being provided with barbs on their inner faces for impaling a slice of bread or the like thereon, said plates each being provided with a double flange at its lower margin, said flange extending at right angles to the plane of the plate and to the hinged axis of the plates and extending to each side thereof, said flanges being constructed and arranged to telescope one within the other to permit said plates to be pivoted to a closed position of parallelism.

2. A device for use as described, comprising a pair of similar plates hingedly secured together, barbs formed on said plates and projecting beyond the inner face thereof, and double flanges at the lower edges of said plates extending at right angles thereto and at right angles to the hinged axis of the plates and projecting beyond each side of the plates, the flanges of one plate being constructed and arranged to telescope within the flanges of the other to permit said plates to be pivoted to a position of parallelism.

PERCY H. HALBRITER.

References Cited in the file of this patent

UNITED STATES PATENTS

| Number | Name | Date |
|---|---|---|
| 188,437 | Wells | Oct. 5, 1875 |
| 363,519 | Houston | May 24, 1887 |
| 752,006 | Smith | Feb. 9, 1904 |
| 1,118,989 | Wolf | Dec. 1, 1914 |
| 1,952,644 | Walter | Mar. 27, 1934 |
| 2,070,829 | Everly | Feb. 16, 1937 |
| 2,104,577 | Adamczyk | Jan. 4, 1938 |
| 2,207,236 | Cohen | July 9, 1940 |
| 2,358,682 | Benton et al. | Sept. 19, 1944 |